(12) United States Patent
Lee

(10) Patent No.: US 7,269,921 B2
(45) Date of Patent: Sep. 18, 2007

(54) FISHING NET DEVICE, AND SYSTEM

(76) Inventor: Bruce R. Lee, 19507 Ware Creek Rd., Rappahannock Academy, VA (US) 22538

( * ) Notice: Subject to any disclaimer, the term of this patent is extended or adjusted under 35 U.S.C. 154(b) by 198 days.

(21) Appl. No.: 11/083,957

(22) Filed: Mar. 21, 2005

(65) Prior Publication Data

US 2006/0207159 A1    Sep. 21, 2006

(51) Int. Cl.
*A01K 77/00* (2006.01)
(52) U.S. Cl. .......................................................... 43/12
(58) Field of Classification Search ...................... 43/7, 43/11, 12; 114/221 R; 403/109.1–109.3, 403/378
See application file for complete search history.

(56) References Cited

U.S. PATENT DOCUMENTS

| | | | | | |
|---|---|---|---|---|---|
| 1,921,323 | A | * | 8/1933 | Purdon | 43/12 |
| 2,544,926 | A | * | 3/1951 | Keeney, Sr. | 43/12 |
| 4,050,177 | A | * | 9/1977 | Gerritsen | 43/12 |
| 5,099,597 | A | * | 3/1992 | Whistle | 43/11 |
| 6,918,203 | B2 | * | 7/2005 | Robichaud | 43/8 |
| 2005/0262754 | A1 | * | 12/2005 | Wilson | 43/11 |

* cited by examiner

*Primary Examiner*—Kimberly S. Smith
(74) *Attorney, Agent, or Firm*—William L. Klima; Klima Law Offices PLLC

(57) ABSTRACT

A fishing net device, and system. The fishing net device is compressible to releasably connect the fishing net device to the boat.

17 Claims, 5 Drawing Sheets

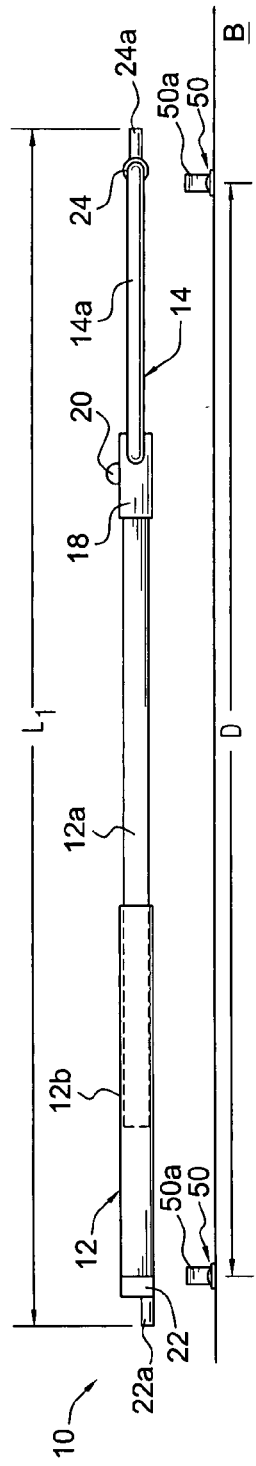
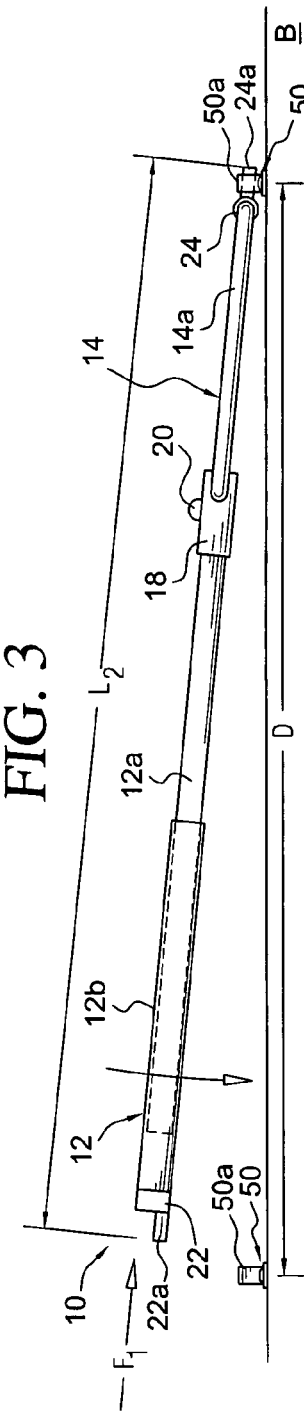
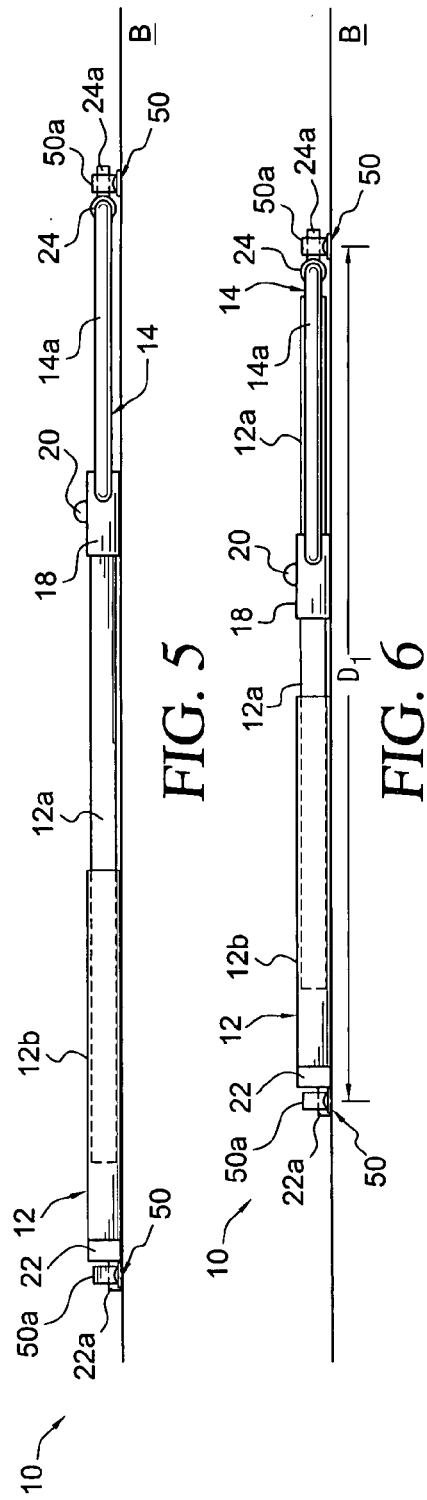

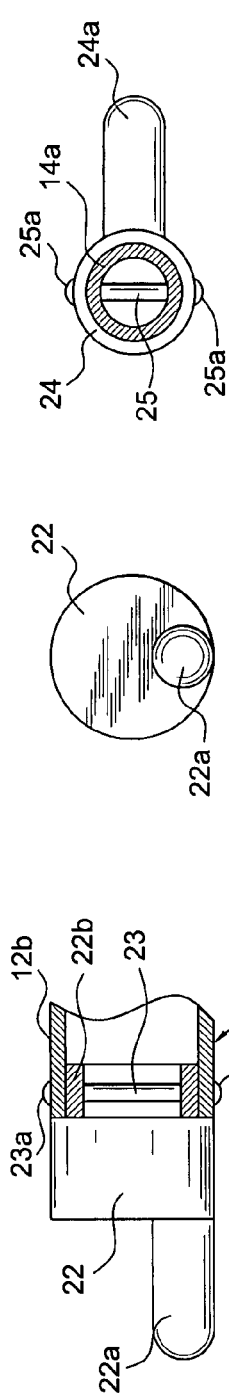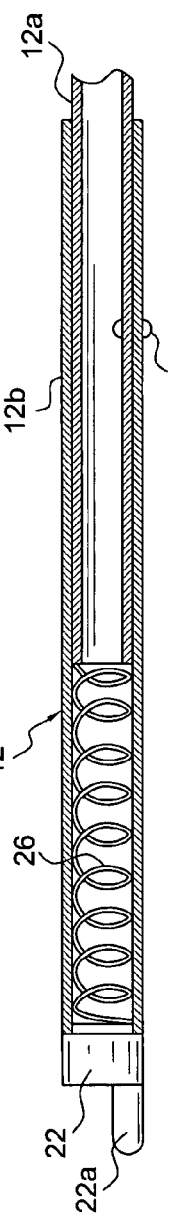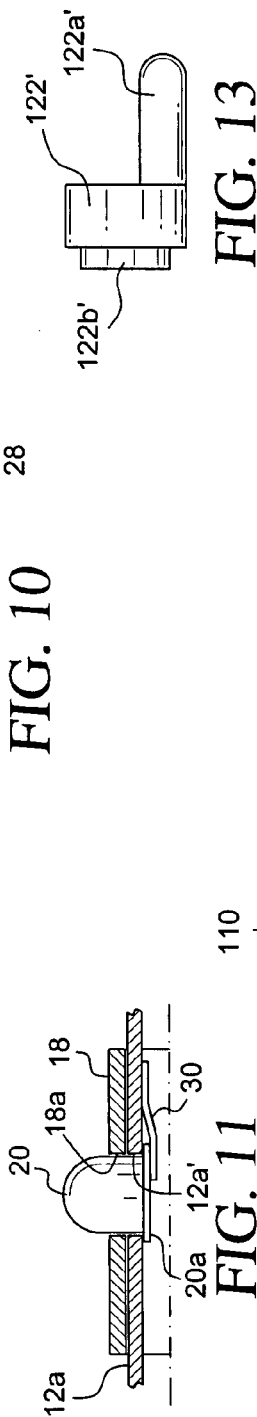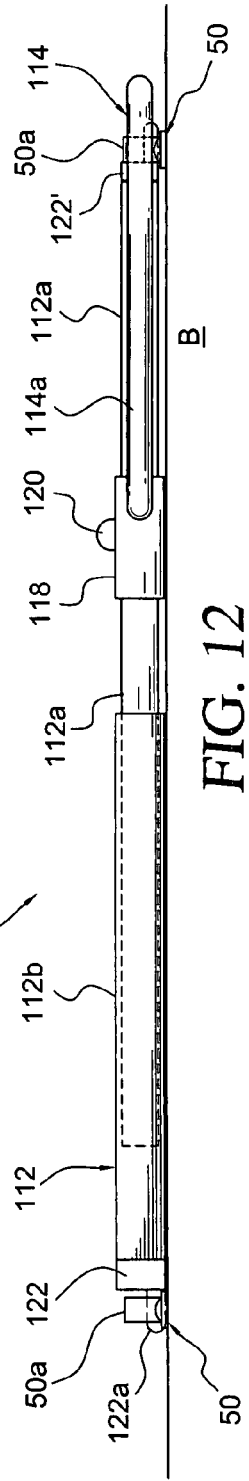

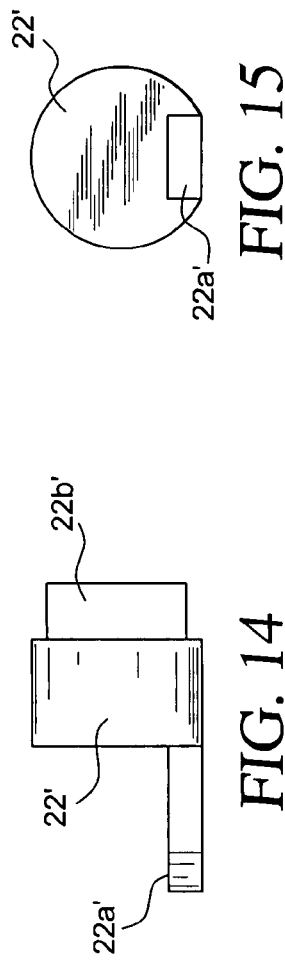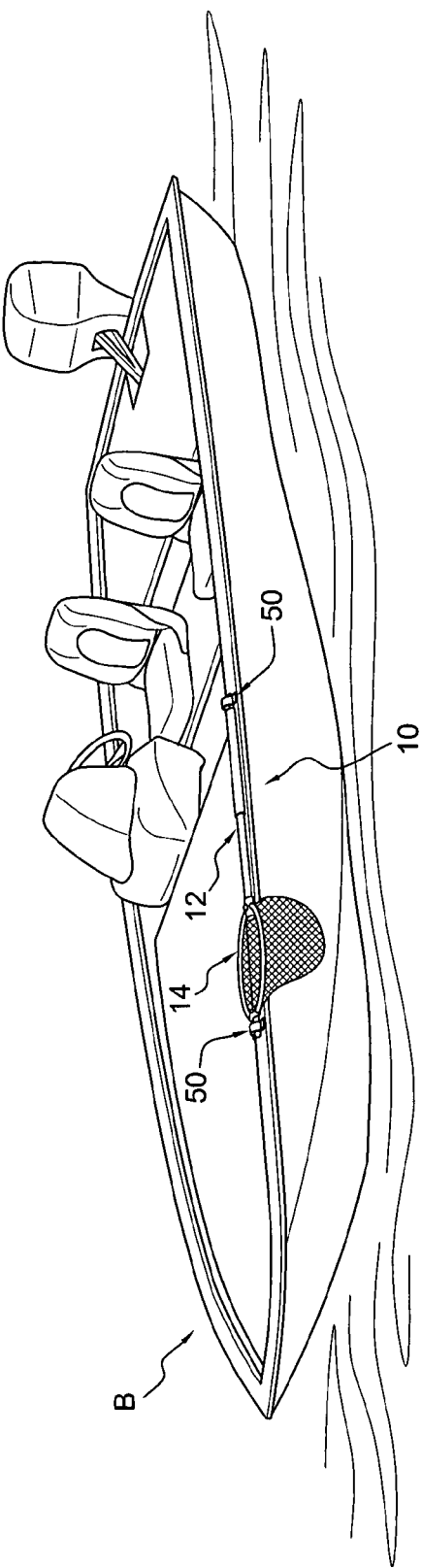

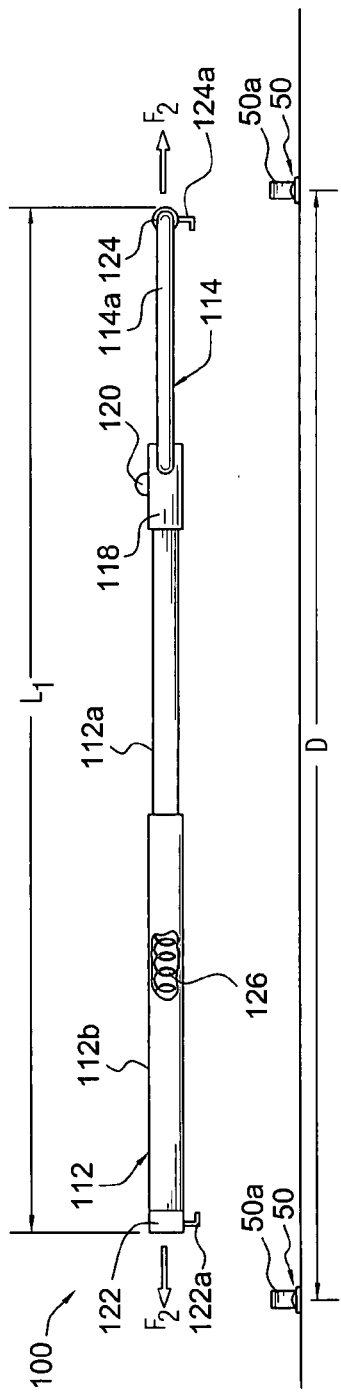
FIG. 18
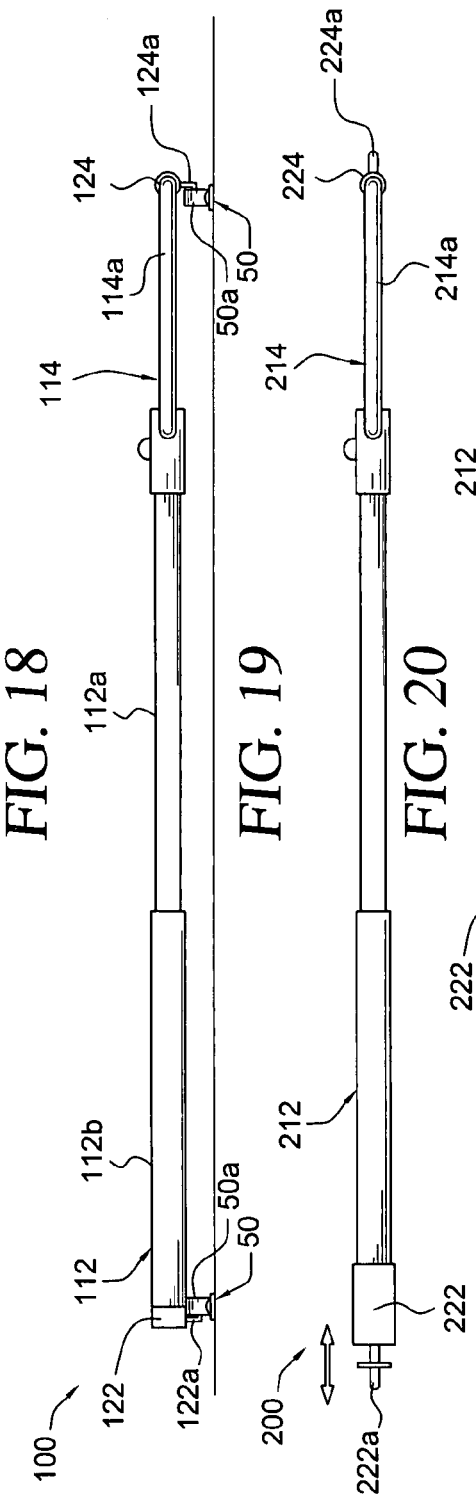
FIG. 19
FIG. 20
FIG. 21

FISHING NET DEVICE, AND SYSTEM

FIELD OF THE INVENTION

The present invention is directed to a fishing net device, in particular a hand-held fishing net device. The fishing net system is directed to a fishing net device releasably connected to a boat.

BACKGROUND OF THE INVENTION

Currently, hand held fishing nets are used by both fresh water and salt-water fishermen during both recreational and competitive fishing. The conventional fishing net includes a wood or aluminum handle connected to a net. The net typically is an aluminum hoop provided with a handle and nylon netting.

Fishing nets are typically stored on the floor or side of the boat during non-use. Some fishermen place the fishing net in devices or holders for fishing poles during non-use. When fishing, the fishermen places the fishing net in close proximity at a location near where fishing from the boat so that when a fish is hooked on the line the fisherman can quickly and easily grab the fishing net by the handle readied for use when the fish nears the boat.

Many times the fishing net is left on the floor of the boat and gets kicked around, damaged, or even knocked off the boat, or otherwise is typically in the way. Further, when moving the boat from one location to another, particularly during a fishing competition, the loose fishing net on the floor can rattle around and sometimes be lost overboard, in particularly in bass type fishing boats where the inside board is very low or nonexistent. Many bass fishermen grab the loose net just prior to taking off with the boat, and purposely stand on the fishing net when moving the boat so as to not loose same during travel. This type of use is inconvenient and messy for the fishermen.

The present invention is directed to a fishing net device and system for releasably connecting a fishing net device to the boat during non-use and/or when traveling or moving the boat. The fishing net device and system according to the present invention overcomes a number of problems and inconveniences currently experienced by conventional hand-held fishing nets.

SUMMARY OF THE INVENTION

A first object of the present invention is to provide an improved fishing net device.

A second object of the present invention is to provide an improved fishing net device configured to be releasably connected to a boat.

A third object of the present invention is to provide a fishing net system.

A fourth object of the present invention is to provide an improved fishing net system, including a fishing net device and a boat-anchoring device releasably connecting the fishing net device to a boat.

A fifth object of the present invention is to provide a fishing net system including a fishing net device according to the present invention with a boat anchoring device for releasably connecting the fishing net device to a boat.

A sixth object of the present invention is to provide a fishing net system including a fishing net device configured to be compressed to cooperate and releasably connect to a boat-anchoring device.

A seventh object of the present invention is to provide a fishing net system including a fishing net configured to be compressed against a spring bias, and then releasably connect to a boat anchoring device when released to expand and connect with the boat anchoring device.

A eighth object of the present invention is to provide a fishing net system including a fishing net having a spring biased compressible handle portion configured to initially be compressed and then releasably connect to a boat anchoring device when expanded.

A ninth object of the present invention is to provide a fishing net device and system, including a fishing net device having a spring biased telescoping handle portion configured to be compressed and then expand and releasably connect with a boat anchoring device.

A tenth object of the present invention is to provide a fishing net system including a fishing net device have a compressible handle and/or compressible net portion configured to be spring biased and expand and releasably connect with a boat anchoring device.

The present invention is directed to an improved fishing net device, and fishing net system. The fishing net system includes the combination of a fishing net device and a boat-anchoring device configured to releasably connect the fishing net device to a boat.

The fishing net device and fishing net system according to the present invention, include a fishing net device having one or more components or parts configured to be compressible under force and then expandable when the force is released to releasably connect with a boat anchoring device connected to the boat. Specifically, a preferred embodiment of the fishing net device includes a spring biased telescoping handle and/or a spring biased or resilient net portion. More specifically, the fishing net device is configured to include one or more portions, components or parts that can be compressed along a single axis or multiple axes (preferably the longitudinal axis of the fishing net device), and then released to expand outwardly to releasably connect with or couple with a boat anchoring device connected to the boat to releasably connect the fishing net device to the boat. To release the fishing from the boat once connected, again, the fishing net device is compressed, preferably slightly compressed, to release one or more portions, parts or components of the fishing net from the boat-anchoring device to release the fishing net device from the boat.

In a preferred embodiment, the handle portion of the fishing net is a telescoping handle portion and compressible. For example, the telescoping handle portion includes a first shaft section slideable disposed within a second shaft section. Preferably, the first shaft section is spring biased to force the second shaft section out from the first shaft section by a spring force such as provided by a linear spring, coil spring, bungee cord, rubber band, elastic member or other type of spring component, preferably disposed within the compressible handle itself. Further, the handle portion is preferably provided with a stop to limit the travel of the first shaft section being fully forced out of the second shaft section so that the two shaft sections stay together and have sufficient strength and durability to function as a handle. Specifically, the stop prevents the first shaft section from completely exiting the second shaft section.

In a preferred embodiment, the handle portion is releasably and slideably connected to the net portion so that the handle portion can be released and slide into the hoop of the net portion to further reduce the overall length of the fishing net device.

Alternatively, or in addition the net portion of the fishing net device can be compressible to allow one or more axis of the fishing net device to be compressed, in particular along the longitudal length axis of the fishing net device to allow the fishing net device to be releasably connected to the boat. Specifically, the net portion can be configured to resiliently compress along the length dimension of the fishing net device, and then allowed to expand and connect with the boat-anchoring device to releasably connect the fishing net device to the boat. In some embodiments, both the handle portion and net portion are both compressible along the length axis of the fishing net device to provide ample compression or travel to allow the fishing net device to be coupled or connected with the boat-anchoring device according to the present invention. For example, the rim portion of the net portion can be configured to be flexible to allow the rim portion to change shape during compression (e.g. from circular-shaped to oval-shaped).

In preferred embodiment, the fishing net device and system are configured so that a fisherman can use one hand to connect and disconnect the fishing net device to the boat, preferably using minimal effort and time, and with much convenience. It is important that the fishing net device is easily and quickly released from the boat anchoring device, in particular when a fish on the line is in close proximity to the boat without disturbing or distracting the fisherman during the net release and acquisition from the boat. It is at this point that the fishing net device must be easily and quickly removed and disconnected from the boat by the fisherman using one hand to prevent the fish from being lost from the line, in particular during a fishing competition.

BRIEF DESCRIPTION OF THE DRAWINGS

FIG. 3 is a side elevational view of the fishing net system shown in FIG. 2 with the fishing net device disconnected from the boat-mounting device.

FIG. 4 is a side elevational view of the fishing net system shown in FIG. 2 with the net portion end of the fishing net device connected to the boat-mounting device.

FIG. 5 is a side elevational view of the fishing net system shown in FIG. 2 with the fishing net device connected at both ends to the boat-mounting device.

FIG. 6 is a side elevational view of the fishing net system shown in FIG. 2, however, with the handle portion released into the hoop portion of the fishing net device and attached to the boat by the boat mounting device in a more compressed mode than that shown in FIG. 5.

FIG. 7 is a side elevational view of the handle portion fishing net connector, and a partial longitudinal cross-sectional view of the handle portion showing the connection therebetween of the fishing net device shown in FIG. 1.

FIG. 8 is an end elevational view of the fishing net connector shown in FIG. 8.

FIG. 9 is a side elevational view of the net portion fishing net connector, and a partial cross-sectional view of the hoop portion showing the connection therebetween of the fishing net device shown in FIG. 1.

FIG. 10 is a partial broken away side longitudinal cross-sectional view of the telescoping handle portion of the fishing net device shown in FIG. 1.

FIG. 11 is a broken away cross-sectional view of the first shaft section slidably disposed within the handle connector, and locked into position by a locking pin.

FIG. 12 is another preferred embodiment of the fishing net system according to the present invention.

FIG. 13 is a side elevational view of a first shaft section fishing net connector for the fishing net device shown in FIG. 12.

FIG. 14 is a side elevational view of another embodiment of a fishing net connector for use with the fishing net devices shown in FIGS. 1 and 12.

FIG. 15 is an end elevational view of the fishing net connector shown in FIG. 14.

FIG. 16 is a side elevation view of another embodiment of a low profile boat-anchoring device.

FIG. 17 is a perspective view of a bass fishing boat showing the fishing net system according to the present invention in use.

FIG. 18 is a side elevational view of another embodiment of the fishing net system according to the present invention with the fishing net device disconnected from the boat anchoring devices.

FIG. 19 is a side elevational view of the fishing net system shown in FIG. 18, however, with the fishing net device connected to the boat anchoring devices.

FIG. 20 is a side elevational view of an even further embodiment of the fishing net device according to the present invention.

FIG. 21 is a partial broken away side elevational view of one end of the fishing net device shown in FIG. 20.

DETAILED DESCRIPTION OF PREFERRED EMBODIMENTS

Figure 1:
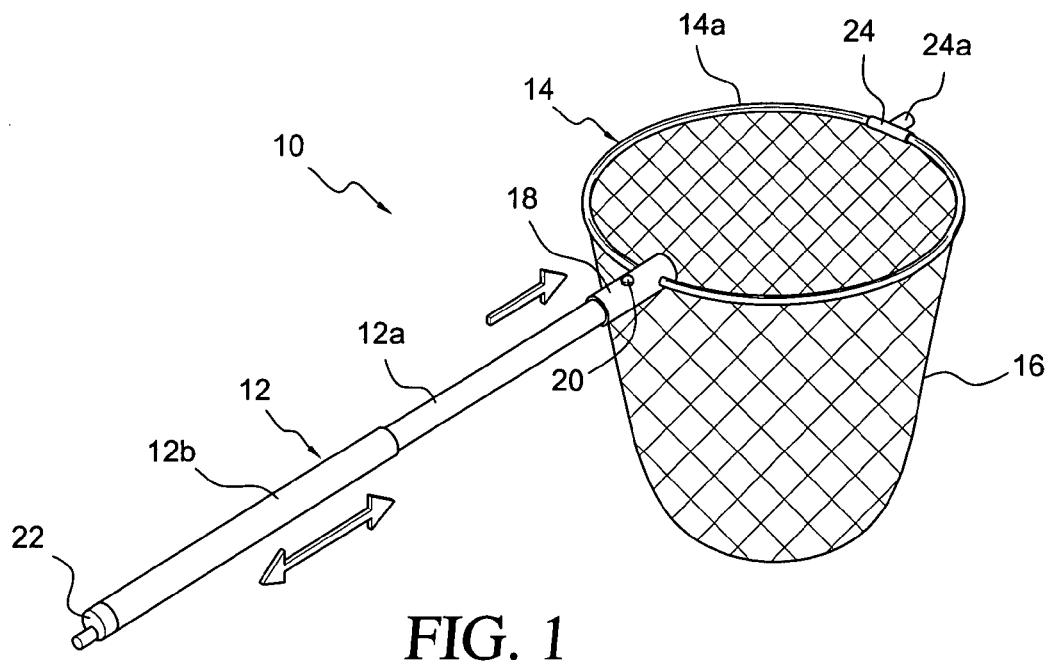
FIG. 1 is a perspective view of a preferred embodiment of a fishing net device according to the present invention.

The present invention is directed to a fishing net device 10 shown in FIG. 1, and a fishing net system including the fishing net device 10 and boat anchoring devices 50, 50.

The fishing net device 10 includes a handle portion 12 connected to a net portion 14. The handle portion 12 is shown as a telescoping handle portion 12, however, the handle portion can be a single piece or have a non-telescoping construction (e.g. one piece wood or metal handle portion).

The telescoping handle portion 12 includes a first shaft section 12a slidably disposed within a second shaft portion 12b. The telescoping handle portion 12 is spring biased, as shown in FIG. 10, and will be described in detail below.

The net portion 14 includes a rim portion 14a supporting a net 16. The rim portion 14a is connected to a handle connector 18 (e.g. by mechanical coupler and/or by welding). The first shaft section 12a of the handle portion 12 is slidably disposed within the handle connector 18. The first shaft section 12a is provided with a locking pin 20 to fit into a through hole in handle connector 18 to lock and unlock the first shaft section 12a from sliding within the handle connector 18. For example, the first shaft section 12a is provided with a spring biased pin 20 to engage with a through hole 20a in the handle connector 18, as shown in detail in FIG. 1, and to be discussed in detail below.

Figure 2:
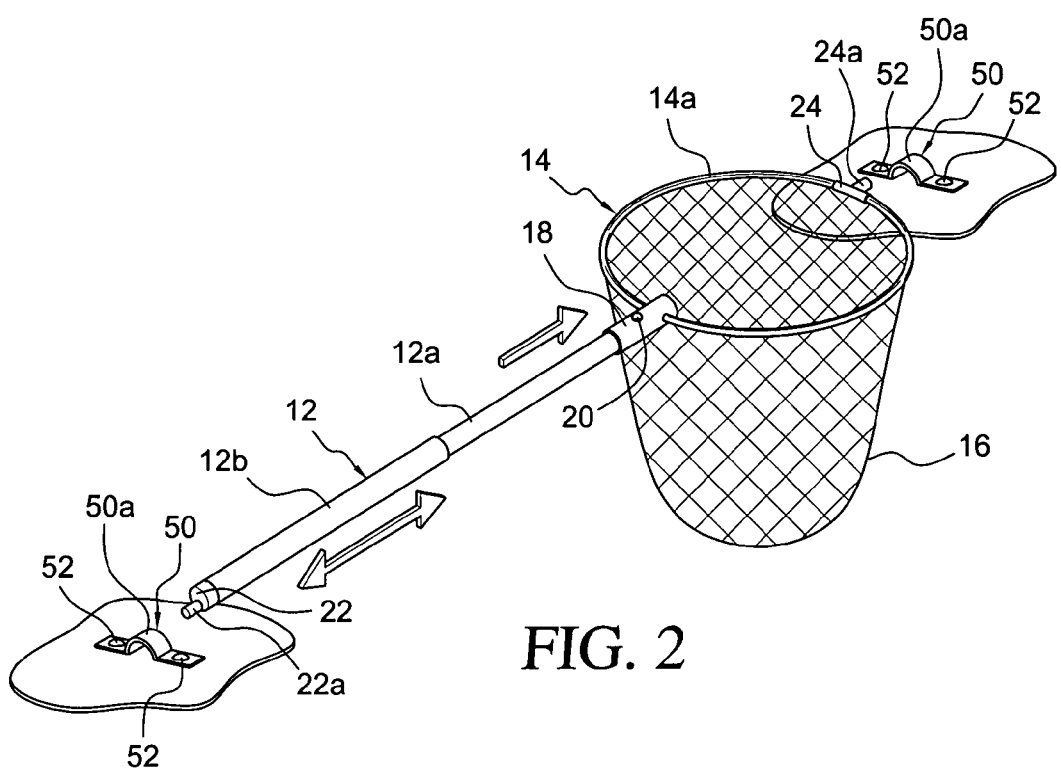
FIG. 2 is a perspective of a preferred embodiment of fishing net system according to the present invention.

The fishing net device 10 is provided with fishing net connectors 22, 24 configured to be releasably connected to a pair of spaced apart boat anchoring devices 50, 50. The fishing net connector 22 is connected to the end of the second shaft section 12b of the handle portion 12, and the fishing net connector 24 is connected to the rim portion 14a of the net portion 14. Again, as shown in FIG. 2, the fishing net connectors 22, 24 cooperate and releasably connect with the boating anchoring devices 50. The boat anchoring devices 50 can be single piece plastic or metal (e.g. brass or stainless steel) loop type connectors secured to the deck or other portions of the boat by screw fasteners 52. Specifically, the pin portions 22a and 24a of the fishing net connectors 22, 24, respectively, are configured to fit underneath the loop portions 50a, 50a of the boat anchoring devices 50, 50.

The fishing net device 10 is shown disconnected, partially connected, and fully connected to the boat in the connection sequence shown in FIGS. 3, 4 and 5.

The boat anchoring devices 50, 50 are shown connected to the deck of the boat B, and are set apart a distance D less than the length $L_1$ of the fishing net device 10, as shown in FIG. 3. The fishing net device 10 is then tilted to connect the fishing net connector 24 of the net portion 14 to the right side boat-anchoring device 50. Specifically, the pin portion 24a of the fishing net connector 24 is positioned into the loop portion 50a of the boat-anchoring device 50. A force $F_1$ is applied by a user gripping the second shaft section 12b of the handle portion 12, and pushing the second shaft portion 12b towards the first shaft portion 12a so as to begin compressing the handle portion 12a to an extent so that the overall length $L_2$ of the fishing net device 10 in this compressed mode is less than the distance D between the boat anchoring devices 50, 50, as shown in FIG. 4. The fishing net device 10 is further tilted downwardly to then be parallel with the surface of the deck of the boat B, and then the force $F_1$ is released while guiding the pin portion 22a of the fishing net connector 22 into the loop portion 50a of the left side boat anchoring device 50 to fully releasably connect the fishing net device 10 to the boat B.

In the embodiment of the fishing net system shown in FIGS. 3-5, the first shaft section 12a remains connected to the handle connector 18 of the net portion 14 by pin 20. Alternatively, the fishing net system can be configured so that the first shaft section 12a is unlocked by pressing locking pin 20 downwardly to allow the first shaft section 12a of the handle portion 12 to slide within the loop portion 14a of the net portion to the configuration shown in FIG. 6. In this manner, the overall length $L_3$ in this compressed mode is significantly less than the length $L_2$ (FIG. 4) when the first shaft section 12a remains locked to the handle connector 18.

In the embodiment shown in FIG. 6, the boat anchoring devices 50, 50 are connected to the boat B at a closer distance $D_1$ versus the distance D shown in FIGS. 3-5.

A detailed view of the fishing net connector 22 is shown in FIGS. 7 and 8.

The fishing net connector 22 includes a round pin portion 22a and a round flange portion 22b disposed within the end of the second shaft portion 12b of the handle portion 12. The fishing net connector 22 can be a single piece construction (e.g. injection molded plastic or machined from a single metal billet), or can be made of multiple pieces and then assembled together (e.g. injection molded plastic body with metal pin insert). A rivet 23 having head portions 23a, 23a firmly connects the fishing net connector 22 to the handle portion 12.

The fishing net connector 24 is shown in FIG. 9.

The fishing net connector 24 includes a round pin 24a, and can be made as a single piece construction (e.g. plastic injection molded or machined from a single piece of metal billet), or can be made as separate components assembled together (e.g. injection molded plastic body with metal pin insert). The fishing net connector 24 is firmly connected to the rim portion 14a of the net portion 14 by rivet 25 having head portions 25a.

A detailed view of the handle portion 12 is shown in FIG. 10.

The first shaft section 12 is slidably disposed within the second shaft portion 12b. For example, the first shaft section 12a has an outer diameter slightly less than the inner diameter of the second shaft section 12b. A coil spring 26 is disposed within the second shaft section 12b, and works against the inner surface of the fishing net connector 22 and the outer edge of the first shaft section 12a to biased the first shaft section 12a out of the second shaft section 12b. A rivet 28 passes through a fixed through hole in the second shaft section and rides within a longitudal slot provide in the first shaft section 12a to serve as a stop to prevent the first shaft section 12a from being expelled completely from the section shaft section 12b.

The details of the locking pin 20 are shown in FIG. 11.

The locking pin 20 passes through a through hole 18a in handle connector 18, and through a through hole 12a' of the first shaft section 12a. A cantilever spring 30 is connected to the inner surface of the first shaft section 12a, and is configured to bias the pin 20 outwardly. The locking pin 20 is provided with a flange 20a to prevent the locking pin 20 from being expelled through the hole 12a' by the cantilever spring 30. When the top of the locking pin 20 is pushed downwardly below the thickness of the handle connector 18, the first shaft section 12a is then freed to slide therein.

Another embodiment of the fishing net device 110 is shown in FIG. 11.

The fishing net device 110 is provided with a fishing net connector 122 the same as fishing net connector 22 shown in FIGS. 7 and 8. However, the fishing net connector 24 in the embodiment shown in FIG. 1 (i.e. connected to the loop portion 14a of the net portion 14) is replaced with a fishing net connector 122' connected to the free end of the first shaft section 112a of the handle portion 112. In this manner, only the handle portion 112 is subject to compression when attaching the fishing net device 110 to the boat anchoring devices 50, 50, and no compression force is exerted on the rim portion 114a of the net portion 114.

A detail view of the alternative fishing net connector 122' is shown in FIG. 13.

The fishing net connector 122' includes a round pin portion 122a' and a flange 122b configured to fit within the free end of the first shaft section 112a.

Alternative embodiments of the fishing net connector 22' and boat anchoring device 50', are shown in FIGS. 14-16. These low profile versions reduce the height at which the boat-anchoring device 50 extends above the deck of the boat B. Specifically, the pin 22a' has been reduced in height compared to the pin 22a of the fishing net connector 22 shown in FIG. 8. To maintain the same strength, the pin portion 22a' is widened as shown in FIG. 15. The boat anchoring device 50' is reduced in height from the boat anchoring device 50 shown in FIG. 2 to provide a lower profile. The rectangular-shaped loop portion 50a' accepts the rectangular-shaped pin portion 22a of the low profile fishing net connector 22'.

The fishing net system according to the present invention is shown implemented on the deck of the bass fishing boat B shown in FIG. 17.

The fishing net device 10 is releasably connected to the deck of the fishing boat B by the boat anchoring devices 50, 50. Alternatively, the fishing net device 10 and boat anchoring devices 50, 50 can be located at other locations on the deck and/or sides (e.g. inner sides or outer sides) of the bass fishing boat B. Further more than one fishing net device 10 and/or sets of boat anchoring devices 50 can be installed on the bass fishing boat B.

In the embodiment shown in FIG. 1, the handle portion 12 is compressed and then slightly expanded to releasably connect the fishing net device 10 to the boat B. The net portion 14 can be designed or constructed to be rigid so as to not substantially distort or compress. Alternatively, the loop portion 14a can be designed or constructed to substantially deform or compress when a force is applied to the handle portion 12 and the fishing net connector 24 is engaged with a boat-anchoring device 50. In the manner, both the handle portion 12 and the net portion 14a both compress to releasably connect the fishing net device 10 to the boat B. In a further alternative embodiment, the handle portion 12 is non-compressible (e.g. single piece metal shaft or wood shaft), and only the rim portion 14a is configured to compress to releasably connect the fishing net device to the boat B. In this manner, the loop portion 14a distorts from one shape to another shape (e.g. a circular configuration to an oval configuration) providing enough compression to allow the ends of the fishing net device 10 to be releasably connected to the pair of boat anchoring devices 50, 50 set apart a distance slightly less than the length of the fishing net device 10. Thus, in some embodiments the handle portion compresses, in other embodiments both the handle portion and net portion compress, and in even further embodiments only the net portion compresses to releasably connect the fishing net device to the boat B.

Another embodiment of the fishing net system is shown in FIG. 18.

The fishing net system includes the fishing net device 100 and boat anchoring devices 50, 50. In this embodiment, the handle portion 112 is provided with a spring 126 that resists tension versus resisting compression for the embodiment shown in FIG. 1. Specifically, the handle portion 112 includes a first tubing section 112a slidably disposed within a second tubular section 112b with the spring 126 disposed therein. The ends of the coil spring are anchored at each end to one of the tubular sections 112a, 112b so that a tension force between these tubing sections 112a and 112b must be applied to stretch the length of the handle portion 112 against the resistance provided by the spring 126.

The fishing net device 100 in a resting position has the length $L_1$ as shown in FIG. 18 less than the distance D designating the spacing between the boat anchoring devices 50, 50. The fishing net device 100 is provided with a fishing net connector 122 having a hook end 122a and a fishing net connector 124 having a hook end 124a, as shown in FIG. 18. When the handle portion 112 of the fishing net device 100 is stretched, the hook ends 122a, 124a grip the loop portions 50a, 50a of the boat anchoring devices 50, 50 upon allowing the handle portion 112 to retract slightly. For example, the fishing net connector 124 can be connected to the right side boat anchoring device 50, and then the handle portion 112 is stretched by pulling on the tubing section 112b until the fishing net connector 122 can be connected to the left side boat anchoring device 50. To remove the fishing net device 100, the user grips the tubing section 112b and pulls the tubing section 112b towards the left side to stretch the handle portion 112, and then lifts the handle portion 112 away from the left side boat anchoring device 50 to release the fishing net connector 122 from the loop portion 50a of the left side boat anchoring device 50. Then the other fish net connector 124 is disconnected from the right side boat anchoring device 50. In this matter, this embodiment of the fishing net device 100 operates the opposite (i.e. uses tension force versus compression force of the handle portion for retention) compared with the embodiment shown in FIG. 1.

An even further embodiment of the fishing net device 200 is shown in FIGS. 20 and 21.

The fishing net device 200 includes a handle portion 212 connected to a net portion 214. In this embodiment, the handle portion 212 is shown as a one-piece construction, however, the handle portion 212 can have the same or similar two-part construction of the handle portion of the embodiment shown in FIG. 1.

In this embodiment, the fishing net connector 222 is provided with a spring biased pin connector 222a. A spring 223, as shown in FIG. 21, spring biases the pin 222a outwardly. The pin connector 222a is provided with a stop or fixed washer 222b so that the end of the pin connector 222a connects with the loop portion 50a of a boat anchoring device 50, and then the stop 222b allows a force by the boat anchoring device 50 to be applied against the spring bias of the spring 223 of the fishing net connector 222.

In this embodiment, the fishing net connector 222 eliminates the need for a two part spring biased handle portion, or alternatively, can add to the extent the length of the fishing net device 200 can be compressed when using a two part handle portion. In any event, preferably the fishing net connector 222 itself has sufficient length to provide enough compression or throw distance to allow the fishing net device 200 to be connected and disconnected from the boat anchoring devices 50, 50, the same or similar to those shown in the embodiment of FIG. 1.

OPERATION

During use, the fishing net device 10 is initially releasably connected to the fishing boat B. When the fisherman has a fish on the line and needs to access the fishing net device 10, the fisherman grabs the handle portion 12 (i.e. the second shaft portion 12b) and compresses the handle portion 12 by forcing the handle portion 12 in a direction towards the first shaft portion 12b. Once the pin portion 22a is released from the boat-anchoring device 50 securing the handle portion 12, the fishing net device 10 is tilted upwardly and then removed from the boat-anchoring device 50 securing the net portion 14 of the fishing net device 10. The handle portion 12 expands automatically due to the spring bias applied by coil spring 26 (FIG. 10) until the rivet 28 stops the first shaft section 12a from being expelled from the second shaft section 12b. The fishing net device 10 is now ready to be used.

I claim:
1. A fishing net system, comprising:
   a fish net, including:
   a telescoping handle including a first shaft section slidably disposed within a second shaft section;
   a spring disposed within said telescoping handle configured to bias said first shaft section out of said second shaft section to fully extend said telescoping handle;
   a stop configured for limiting the travel of said first shaft portion out of said second shaft portion and prevent said first shaft portion from being disconnected from said second shaft portion; and
   a net portion connected to said telescoping handle; and
   a boat anchoring device, including:
   a first boat anchoring connector configured to releasably connect to said first shaft section of said telescoping handle; and
   wherein said first shaft section is provided with a pin connector configured to cooperate with and connect to said first boat anchoring connector, and said second shaft section is provided with a pin connector configured to cooperate with and connect to said second boat anchoring connector; and a second boat anchoring connector configured to releasably connect to said second shaft section of said telescoping handle, wherein said fish net is releasably connected to said boat anchoring device by compressing said telescoping handle and placing said telescoping handle between said first anchoring device and said second anchoring device, and then allowing said fish net to expand into releasable contact and connection with said first anchoring portion and said second anchoring portion of said telescoping handle.

2. A system according to claim 1, wherein said telescoping handle is compressed by contacting the pin connector of said first shaft section against said first boat anchoring connector, pressing on said second shaft section to cause said telescoping handle to at least partially compress, and then allowing the pin connector of said second shaft section to contact with and expand into said second boat anchoring connector.

3. A system according to claim 1, wherein said telescoping handle is releasably connected to said net portion.

4. A system according to claim 3, wherein said telescoping handle is releasably and slidably connected to said fishing net portion so that at least of portion of said telescoping handle once released can slide into a hoop of said net portion.

5. A system according to claim 1, wherein said first and second boat anchoring connectors are defined by a loop fastener configured to cooperate with and connect to said pin connector.

6. A fishing net system, comprising:
a fishing net, including:
a handle portion; and
a net portion connected to said handle portion; and
a pair of spaced apart pin connectors provided on said fishing net; and
a boat anchoring device comprising a pair of spaced apart loop connectors connected to a boat, said boat anchoring device configured to releasably connect said fishing net to said boat when said fishing net is a least partially compressed.

7. A system according to claim 6, wherein said handle portion is configured to compress for attaching said fishing net to said boat.

8. A system according to claim 7, wherein said handle portion is a telescoping handle portion, including a first shaft section slidably disposed within a second shaft section.

9. A system according to claim 8, wherein said telescoping handle portion includes a spring for biasing said first shaft section out of said second shaft section, and a stop to limited said first shaft section extending out of said second shaft section.

10. A system according to claim 6, wherein said net portion is configured to be compressed.

11. A system according to claim 10, wherein a hoop of said net portion is configured to resiliently compress.

12. A system according to claim 6, wherein both said handle portion and said net portion are configured to compress for attaching said fishing net to said boat.

13. A system according to claim 6, wherein said boat anchoring device includes a first said loop connector configured to cooperate with and connect to a first said pin connector provided on said handle portion, and a second said loop connector configured to cooperate with and connect to a second said pin connector provided on said handle portion for releasably connecting said fishing net to said boat.

14. A system according to claim 9, wherein said boat anchoring device includes a first said loop connector configured to cooperate with and connect to a first said pin connector provided on said first shaft section of said handle portion, and a second said loop connector configured to cooperate with and connect to a second said pin connector provided on said second shaft section of said handle portion for releasably connecting said fishing net to said boat.

15. A system according to claim 6, wherein said boat anchoring device includes a first said loop connector configured to cooperate with and connect to a first said pin connector provided on said handle portion, and a second said loop connector configured to cooperate with and connect to a second said pin on said net portion for releasably connecting said fishing net to said boat.

16. A system according to claim 11, wherein said boat anchoring device includes a first said loop connector configured to cooperate with and connect to a first said pin connector provided on said handle portion, and a second said loop connector configured to cooperate with and connect to a second said pin on said net portion for releasably connecting said fishing net to said boat.

17. A system according to claim 12, wherein said boat anchoring device includes a first said loop connector configured to cooperate with and connect to a first said pin connector provided on said handle portion, and a second said loop connector configured to cooperate with and connect to a second said pin on said net portion for releasably connecting said fishing net to said boat.

* * * * *